United States Patent
Guyomard

(10) Patent No.: US 6,378,268 B1
(45) Date of Patent: Apr. 30, 2002

(54) COMPOSITE STRUCTURAL ELEMENT, ESPECIALLY FRONT-FACE SUPPORT FOR A VEHICLE

(75) Inventor: Jean-Nicolas Guyomard, Le Mesnil Fuguet (FR)

(73) Assignee: Valeo Thermique Moteur, La Verriere (FR)

( * ) Notice: Subject to any disclaimer, the term of this patent is extended or adjusted under 35 U.S.C. 154(b) by 0 days.

(21) Appl. No.: 09/661,910

(22) Filed: Sep. 14, 2000

(30) Foreign Application Priority Data

Sep. 15, 1999 (FR) .............................................. 99 11525

(51) Int. Cl.[7] .............................................. E04C 3/30
(52) U.S. Cl. .................... 52/735.1; 52/731.6; 52/731.1; 280/800
(58) Field of Search .............................. 52/735.1, 731.6, 52/731.1, 730.6, 724.3, 309.1, 309.13, 309.15; 280/800, 781

(56) References Cited

FOREIGN PATENT DOCUMENTS

| EP | 0 370 342 A | 5/1990 |
|---|---|---|
| GB | 2 196 584 A | 5/1988 |

*Primary Examiner*—Carl D. Friedman
*Assistant Examiner*—Beth A. Stephan
(74) *Attorney, Agent, or Firm*—Liniak, Berenato, Longacre & White

(57) ABSTRACT

The element has a first component of the general shape of a channel exhibiting opposite free edges, and a second, plastic component overmoulded onto the first component.

Each free edge is divided, in its longitudinal direction, into segments which are offset with respect to one another alternately inwards and outwards in the sideways direction of the channel. The second component forms, on each free edge, a longitudinal bead which covers over the outer face of the segments which are offset inwards and the inner face of the segments which are offset outwards.

This element can be used as a front-face support for a motor vehicle.

11 Claims, 2 Drawing Sheets

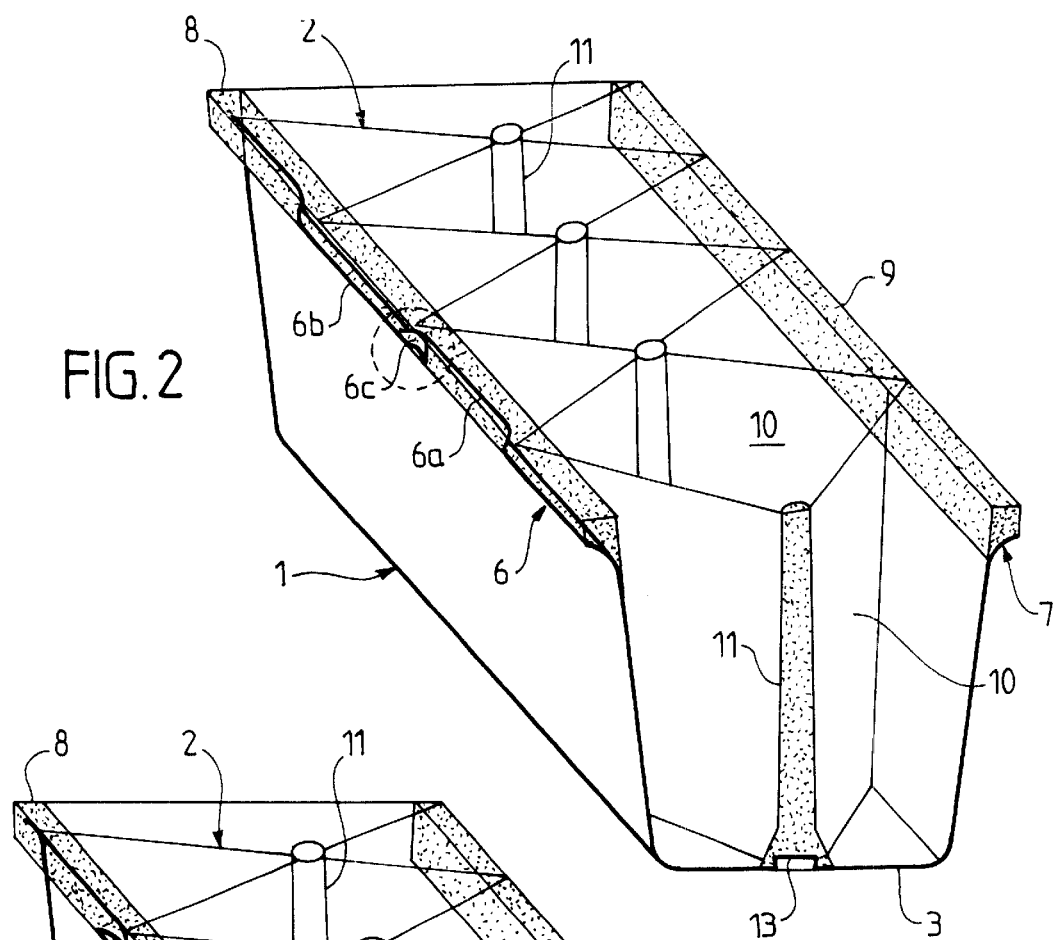
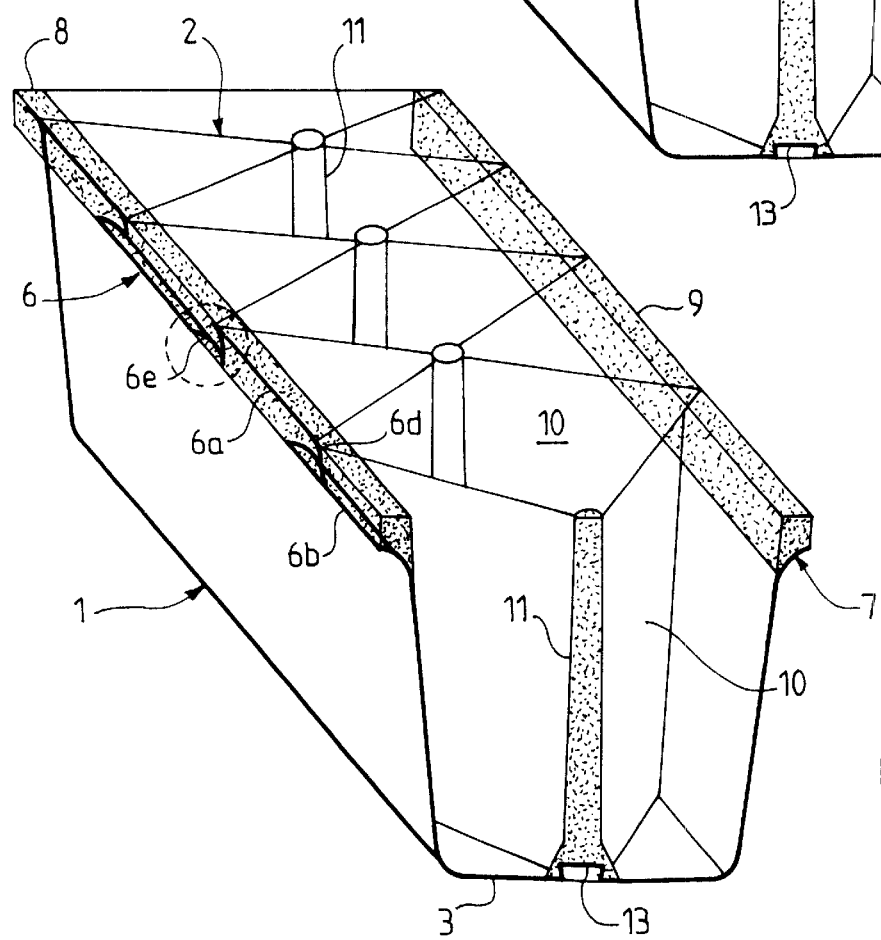

COMPOSITE STRUCTURAL ELEMENT, ESPECIALLY FRONT-FACE SUPPORT FOR A VEHICLE

FIELD OF THE INVENTION

The invention relates to a structural element which can be used especially, but not exclusively, as a front-face support for a motor vehicle.

BACKGROUND OF THE INVENTION

It is current practice nowadays, when assembling a motor vehicle, to put in place, at the front thereof, various items of apparatus such as lighting units, heat exchangers, sound warning devices, bonnet lock, in the form of a subassembly in which these items of apparatus are fixed onto a support known as front-face support. Such a subassembly can be produced by an equipment manufacturer, and the motor-vehicle constructor has only to offer it up to the front of the vehicle and fix the front-face support onto the structure of the vehicle, thus indirectly fixing the items of apparatus carried by the front-face support, with no need to handle or individually fix these items of apparatus onto the structure of the vehicle. This constitutes a considerable simplification of the vehicle-assembly operations.

EP 0 658 470 A describes such a front-face support comprising a body made of plastic overmoulded onto a metal reinforcement made from stamped sheet metal.

EP 0 370 342 A describes a structural element comprising a first component having the general shape of a channel featuring free opposite edges, and a second component made of plastic overmoulded onto the first component, defining at least one web which extends transversely within the channel, and being extended outside the channel in the region of the said free edges.

In this known element, the second component is linked with the free edges of the first component only in discrete areas along the edges through apertures which are formed therein.

The object of the invention is to obtain a more rigid link between the second component and the free edges of the first component.

SUMMARY OF THE INVENTION

According to one aspect the invention comprises structural element comprising a first component and a second component, the first component having the general shape of a channel exhibiting opposite free edges, and the second component being of plastics and being overmoulded onto the first component, defining at least one web which extends transversely within the channel, and being extended outside it in the region of the said free edges, wherein each free edge is divided, in its longitudinal direction into segments which are offset with respect to one another alternately inwards. and outwards in the lateral direction of the channel, and wherein the second component forms, on each free edge, a longitudinal bead which covers over the outer face of the segments which are offset inwards and the inner face of the segments which are offset outwards.

The bead may thus be linked with the free edge over the entire length thereof, serving it as a support both inwards as well as outwards.

Optional characteristics of the invention, which are supplementary or alternative, are set out below:

Each bead exhibits a substantially uniform cross section.

Each bead also covers over the inner face of the segments which are offset inwards.

The segments of the same free edge are separated from one another by cut-outs.

The segments of the same free edge are connected to one another by portions which are inclined with respect to the longitudinal direction of the said edge, ensuring the continuity thereof.

The said inclined portions, including their free cut edges, are encased in the said bead.

The segments of at least one of the two series, inner and outer, exhibit a curved shape in cross section.

The segments of the two series exhibit, in cross section, shapes which are curved according to different radii.

The wall of the channel, at a distance from the said free edges, exhibits at least one inwards-reentrant deformation, which is encased in the second component in order to provide mutual mechanical fastening without piercing of the wall.

The said reentrant deformation is formed in a bottom region of the channel, substantially at equal distance from the two free edges.

According to another aspect the invention comprises a front-face support for a vehicle, comprising a structural element comprising a first component and a second component, the first component having the general shape of a channel exhibiting opposite free edges, and the second component being of plastics and being overmoulded onto the first component, defining at least one web which extends transversely within the channel, and being extended outside it in the region of the said free edges, wherein each free edge is divided, in its longitudinal direction into segments which are offset with respect to one another alternately inwards and outwards in the lateral direction of the channel, and wherein the second component forms, on each free edge, a longitudinal bead which covers over the outer face of the segments which are offset inwards and the inner face of the segments which are offset outwards.

BRIEF DESCRIPTION OF THE DRAWINGS

The characteristics and advantages of the invention will be set out in greater detail in the description below, by referring to exemplary preferred embodiments illustrated in the attached drawings, in which:

FIGS. 2 and 3 are views in perspective, partially cut away, of two structural elements according to the invention.

DESCRIPTION OF THE PREFERRED EMBODIMENTS

Figure 1:
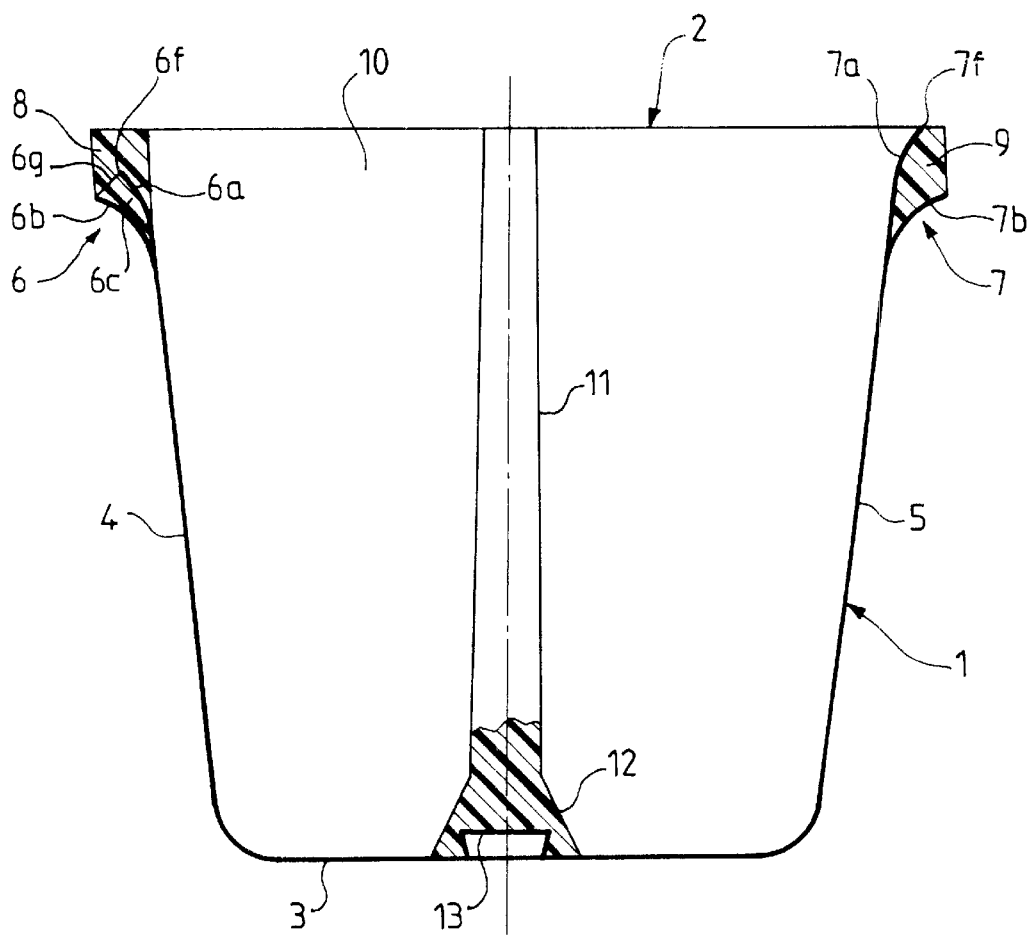
FIG. 1 is a view in cross section of the composite structural element according to the invention.

In the various figures, like reference numerals refer to like parts unless otherwise specified.

The structural element represented on each of FIGS. 1 to 3 comprises a first channel-shaped component 1 obtained, for example, by stamping from a sheet steel plate, and a second, plastic component 2 overmoulded, for example by injection, onto the component 1. The channel 1 is a U-shaped profiled component comprising a bottom 3 and two sidewalls 4, 5, exhibiting, at the opposite end from the bottom 3, respective free edges 6, 7.

Figure 2A:
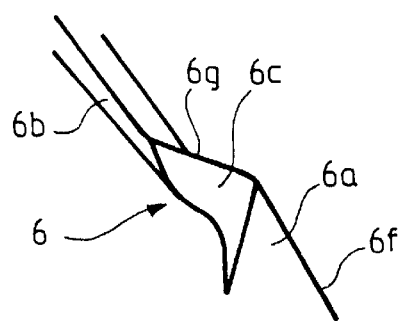
FIGS. 2a and 3a are enlarged details from FIGS. 2 and 3 respectively, partly showing a free edge of the first component.
Figure 3A:
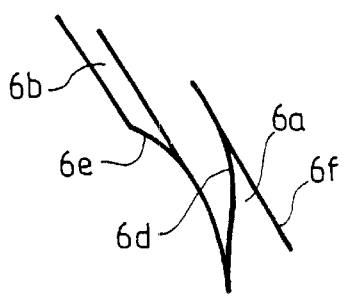

Each free edge is divided, in its longitudinal direction, into segments which are offset with respect to one another alternately inwards and outwards in the lateral direction of the channel. Thus, the free edge 6 comprises inner segments 6a and outer segments 6b, and the edge 7 comprises inner segments 7a and outer segments 7b. The segments 6a and 6b (and, clearly, also the segments 7a and 7b) can be linked together by portions 6c which are inclined with respect to the longitudinal direction of the edge 6, as shown in FIGS. 2 and 2a. In a variant, as shown in FIGS. 3 and 3a, the segments 6a, 6b may be terminated by free cut edges 6d, 6e resulting from cut-outs formed in the sheet metal, with no material being removed.

The second, overmoulded component comprises two beads 8, 9, extending respectively along the edges 6 and 7 of the channel, which are linked together by webs 10. FIG. 1, in its left-hand half and in its right-hand half, illustrates two possible arrangements of the bead 8, 9 with respect to the edges 6, 7. Clearly, it is possible to adopt the same arrangement on the two sides of an element, this arrangement possibly being that of the left-hand side or that of the right-hand side of FIG. 1 indiscriminately.

On the left-hand side, the inner segments 6a, and the connecting portions 6c if they exist, are entirely encased in the bead 8. On the other hand, only the inner face of the outer segments 6b is covered over by the bead. The longitudinal free edges 6f of the segments 6a, and, if appropriate, the free edges 6g of the portions 6c, are themselves buried in the bead 8, which extends higher, that is to say further from the plane of the bottom 3, than the edge 6.

In contrast, the bead 9 of the right-hand side covers over only the outer face of the inner segments 7a and the inner face of the outer segments 7b, and comes flush, in height, with the longitudinal cut edges 7f of the segments 7a.

In all cases, as can be seen in FIGS. 2 and 3, the beads 8, 9 may have a constant cross section over their entire length.

For simplicity, the configuration of the right-hand edge of the channel 1 is not represented in FIGS. 2 and 3, this configuration possibly being comparable to that of the left-hand edge.

The segments of the free edges 6, 7 which are represented in FIGS. 1 and 3a are curved outwards, with a smaller radius of curvature for the outer segments 6b, 7b than for the inner segments 6a, 7a. In a variant, the inner segments 6a may be flat as shown in FIG. 2a, and the inner and/or outer segments may have a more complex profile like the outer segments 6b represented in FIG. 2a.

The beads 8 and 9 are linked together by a multiplicity of webs 10 extending substantially along planes which are inclined with respect to the longitudinal direction of the element and which intersect in pairs at mid-width thereof. Along each line of intersection of two webs extends a vertical column 11, that is to say a column perpendicular to the bottom 3, with a diameter larger than the thickness of the webs, which bears on the bottom 3 via a widened plinth 12. Each plinth 12 encases a reentrant projection 13 produced by a local deformation of the bottom 3 inwards on the channel, thus providing mechanical fastening of the component 2 and of the bottom 3.

For the use of the element according to the invention as a front-face support for a vehicle, the second component is moulded in such a way as to exhibit, in a way which is known in itself, especially outside the channel 1, appropriate parts for fixing items of apparatus onto the support and for fixing the latter onto the structure of the vehicle.

What is claimed is:

1. A structural element comprising a first component and a second component, the first component having the general shape of a channel exhibiting opposite free edges, and the second component being of plastics and being overmoulded onto the first component, defining at least one web which extends transversely within the channel, and being extended outside it in the region of the said free edges, wherein each free edge is divided, in its longitudinal direction into segments which are offset with respect to one another alternately inwards and outwards in the lateral direction of the channel, and wherein the second component forms, on each free edge, a longitudinal bead which covers over the outer face of the segments which are offset inwards and the inner face of the segments which are offset outwards.

2. The element of claim 1, in which each bead exhibits a substantially uniform cross section.

3. The element of claim 1, in which each bead also covers over the inner face of the segments which are offset inwards.

4. The element of claim 1, in which the segments of the same free edge are separated from one another by cut-outs.

5. The element of claim 1, in which the segments of the same free edge are connected to one another by portions which are inclined with respect to the longitudinal direction of the said edge, ensuring the continuity thereof.

6. The element of claim 5, in which the said inclined portions, including their free cut edges, are encased in the said bead.

7. The element of claim 1, in which the segments of at least one of the two series, inner and outer, exhibit a curved shape in cross section.

8. The element of claim 7, in which the segments of the two series exhibit, in cross section, shapes which are curved according to different radii.

9. The element of claim 1, in which the wall of the channel, at a distance from the said free edges, exhibits at least one inwards-reentrant deformation, which is encased in the second component in order to provide mutual mechanical fastening without piercing of the wall.

10. The element of claim 9, in which the said inwards-reentrant deformation is formed in a bottom region of the channel, substantially at equal distance from the two free edges.

11. A front-face support for a vehicle, comprising a structural element comprising a first component and a second component, the first component having the general shape of a channel exhibiting opposite free edges, and the second component being of plastics and being overmoulded onto the first component, defining at least one web which extends transversely within the channel, and being extended outside it in the region of the said free edges, wherein each free edge is divided, in its longitudinal direction into segments which are offset with respect to one another alternately inwards and outwards in the lateral direction of the channel, and wherein the second component form, on each free edge, a longitudinal bead which covers over the outer face of the segments which are offset inwards and the inner face of the segments which are offset outwards.

* * * * *